(12) United States Patent
Teng et al.

(10) Patent No.: US 12,159,648 B1
(45) Date of Patent: Dec. 3, 2024

(54) BRIDGED T-COIL FOR INCREASED BANDWIDTH IN HARD DISK DRIVE WRITE CIRCUITRY

(71) Applicant: Marvell Asia Pte Ltd, Singapore (SG)

(72) Inventors: Kok Hin Teng, Singapore (SG); Devrishi Khanna, Singapore (SG); Kai Wu, Singapore (SG); Sheung Yan Simon Ng, Singapore (SG)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/462,915

(22) Filed: Sep. 7, 2023

Related U.S. Application Data

(60) Provisional application No. 63/407,618, filed on Sep. 16, 2022.

(51) Int. Cl.
  G11B 20/10 (2006.01)
(52) U.S. Cl.
  CPC .. G11B 20/10388 (2013.01); G11B 20/10342 (2013.01)
(58) Field of Classification Search
  CPC ....... G11B 5/09; G11B 20/10; G11B 20/0013; G11B 5/00; G11B 2005/0018; G11B 20/10027; G11C 7/02; G11C 5/14; G11C 7/1039
  USPC ..................................................... 360/66, 68
  See application file for complete search history.

(56) References Cited

U.S. PATENT DOCUMENTS

| | | | |
|---|---|---|---|
| 3,155,927 A | 11/1964 | True | |
| 10,498,139 B2 | 12/2019 | Fan | |
| 10,529,480 B2 | 1/2020 | Fan | |
| 10,826,448 B2 | 11/2020 | Fabiano et al. | |
| 2020/0280295 A1 | 9/2020 | Fan et al. | |
| 2024/0153542 A1* | 5/2024 | Brox | G11C 7/1057 |

OTHER PUBLICATIONS

Paramesh, J., et al., "Analysis of the Bridged T-Coil Circuit Using the Extra-Element Theorem," *IEEE Transactions on Circuits and Systems-II: Express Briefs*, 53(12):1408-1412 (2006).
Razavi, B., "The Bridged T-Coil," *IEEE Solid-State Circuits Magazine*, pp. 9-13 (2015).

\* cited by examiner

*Primary Examiner* — Nabil Z Hindi

(57) ABSTRACT

Write apparatus for a disk drive includes a write head, write current circuitry connected to the write head for generating a steady-state write current, overshoot current circuitry connected to the write head for generating write current overshoot pulses, and a T-coil termination network between (a) the write current circuitry and the overshoot current circuitry, and (b) a first node connected to a first input of a transmission line together with the write head. The T-coil termination network may include a first inductor connected to the first node, a second inductor coupled with the first inductor at a second node, and a first termination resistor between the first inductor and a common voltage. An output of the overshoot current circuitry may be connected to the first node, and an output of the write current circuitry may be connected to the second node.

19 Claims, 7 Drawing Sheets

BRIDGED T-COIL FOR INCREASED BANDWIDTH IN HARD DISK DRIVE WRITE CIRCUITRY

CROSS REFERENCE TO RELATED APPLICATION

This disclosure claims the benefit of commonly-assigned U.S. Provisional Patent Application No. 63/407,618, filed Sep. 16, 2022, which is hereby incorporated by reference herein in its entirety.

FIELD OF USE

This disclosure relates to increasing the bandwidth of hard disk drive write circuitry. More particularly, this disclosure relates to the use of a bridged T-coil arrangement for impedance matching between write current drivers and the transmission line together with the write head, to increase bandwidth.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In hard disk drive write circuitry, data is applied as current pulses to a magnetic write head by a write current driver, based on an input data signal. As each pulse begins its excursion (in either the positive or negative direction) toward a steady-state current level, an overshoot amplitude (OSA) is applied by an OSA driver (which may be separate from, or integrated with, the write current driver) for a portion of the pulse duration (the overshoot duration, OSD). Impedance mismatch between the write current driver and/or the OSA driver on the one hand, and the transmission line together with the write head on the other hand, can give rise to reflections or other distortions that limit the bandwidth, and therefore the rate, of the data that can written.

Conventionally, resistance or a shunt inductance has been used for impedance matching, but such techniques may not be effective at high write currents and/or high data rates.

SUMMARY

In accordance with implementations of the subject matter of this disclosure, write apparatus for a disk drive includes a write head, write current circuitry connected to the write head for generating a steady-state write current, overshoot current circuitry connected to the write head for generating write current overshoot pulses, and a T-coil termination network between (a) the write current circuitry and the overshoot current circuitry, and (b) a first node connected to a first input of a transmission line together with the write head.

In a first implementation of such write apparatus, the T-coil termination network may include a first inductor connected to the first node, a second inductor coupled with the first inductor at a second node, and a first termination resistor between the first inductor and a common voltage, an output of the overshoot current circuitry may be connected to the first node, and an output of the write current circuitry may be connected to the second node.

According to a first aspect of that first implementation, the first inductor and the second inductor may be bridged by a first inherent bridge capacitance.

In a first instance of that first aspect, the T-coil termination network may be formed in an integrated circuit device, at least a portion of the first inductor may be formed in a first metal layer of the integrated circuit device, at least a portion of the second inductor may be formed in a second metal layer of the integrated circuit device, and the portion of the first inductor in the first metal layer and the portion of the second inductor in the second metal layer may form the first inherent bridge capacitance.

According to a second aspect of that first implementation, the write head may be configured to receive a half-H-bridge signal, each of the overshoot current circuitry and the write current circuitry may be single-ended, a second input of the write head may be connected to the common voltage, and the common voltage may be centered between supply voltage rails.

According to a third aspect of that first implementation, the write head may be configured to receive a differential signal, the first input of the write head being connected to a positive leg of the differential signal at the first node and a second input of the write head being connected to a negative leg of the differential signal at a third node, the write current circuitry may be differential write current circuitry having a first write current output configured for connecting to the positive leg and a second write current output configured for connecting to the negative leg, the overshoot current circuitry may be differential overshoot current circuitry having a first overshoot current output configured for connecting to the positive leg and a second overshoot current output configured for connecting to the negative leg, the common voltage may be a common mode voltage of an H-bridge signal, and the T-coil termination network may be a differential T-coil termination network.

In a first instance of that third aspect, the first inductor, the second inductor and the first termination resistor may be in the positive leg of the differential T-coil termination network, the output of the overshoot current circuitry that is connected to the first node being the first overshoot current output of the overshoot current circuitry, and the output of the write current circuitry that is connected to the second node being the first write current output of the write current circuitry, the differential T-coil termination network may further include a third inductor, a fourth inductor coupled with the third inductor at a fourth node, and a second termination resistor between the third inductor and the common mode voltage, the second overshoot current output of the overshoot current circuitry may be connected to the third inductor and the write head at the third node, and the second write current output of the write current circuitry may be connected to the fourth node.

In a first variation of that first instance, the third inductor and the fourth inductor may be bridged by a second inherent bridge capacitance.

In a first alternative of that first variation, the T-coil termination network may be formed in an integrated circuit device, at least a portion of the third inductor may be formed in a first metal layer of the integrated circuit device, at least a portion of the fourth inductor may be formed in a second metal layer of the integrated circuit device, and the portion of the third inductor in the first metal layer and the portion of the fourth inductor in the second metal layer may form the second inherent bridge capacitance.

In accordance with implementations of the subject matter of this disclosure, a method for extending bandwidth of write apparatus in a disk drive, where the write apparatus includes a write head, write current circuitry connected to the write head for generating a steady-state write current, and overshoot current circuitry connected to the write head for generating write current overshoot pulses, includes connecting a T-coil termination network between (a) the write current circuitry and the overshoot current circuitry, and (b) a first node connected to a first input of the write head.

In a first implementation of such a method for extending bandwidth of write apparatus in a disk drive, connecting the T-coil termination network may include connecting a first inductor to the first node, coupling a second inductor in series with the first inductor at a second node, and connecting a first termination resistor between the first inductor and a common voltage. The method may further include connecting an output of the overshoot current circuitry to the first node, and connecting an output of the write current circuitry to the second node.

A first aspect of that first implementation may further include bridging the first inductor and the second inductor by a first bridge capacitance.

In a first instance of that first aspect, where the T-coil termination network is formed in an integrated circuit device, bridging the first inductor and the second inductor by a first bridge capacitance may include forming at least a portion of the first inductor in a first metal layer of the integrated circuit device, and forming at least a portion of the second inductor in a second metal layer of the integrated circuit device. The portion of the first inductor in the first metal layer and the portion of the second inductor in the second metal layer may form the first bridge capacitance.

A second aspect of such a method may further include configuring the write head to receive a half-H-bridge signal, each of the overshoot current circuitry and the write current circuitry being single-ended, and connecting a second input of the write head to the common voltage, the common voltage being centered between supply voltage rails.

A first instance of that second aspect may further include configuring the write head to receive an H-bridge signal, the first input of the write head being connected to a positive leg of the H-bridge signal at the first node and a second input of the write head being connected to a negative leg of the H-bridge signal at a third node, connecting a first write current output of the write current circuitry, the write current circuitry being differential, to the positive leg, and connecting a second write current output of the write current circuitry to the negative leg, and connecting a first overshoot current output of the overshoot current circuitry, the overshoot current circuitry being differential, to the positive leg, and connecting a second overshoot current output of the overshoot current circuitry to the negative leg.

In a first variation of that first instance, where the common voltage is a common mode voltage of H-bridge circuitry, connecting the T-coil termination network may include connecting a differential T-coil network, and connecting a first termination resistor between the first inductor and a common voltage may include connecting the first termination resistor between the first inductor and the common mode voltage.

In a first alternative of that first variation, where the first inductor, the second inductor and the first termination resistor are in the positive leg of the differential T-coil termination network, the output of the overshoot current circuitry that is connected to the first node is the first overshoot current output of the overshoot current circuitry, and the output of the write current circuitry that is connected to the second node is the first write current output of the write current circuitry, connecting the differential T-coil termination network may include connecting the second overshoot current output of the overshoot current circuitry to a third inductor and the write head at a third node, connecting a fourth inductor coupled in series with the third inductor at a fourth node, and connecting a second termination resistor between the third inductor and the common mode voltage. The method may further include connecting the second write current output of the write current circuitry to the fourth node.

A first variant of that first alternative may further include bridging the third inductor and the fourth inductor by a second bridge capacitance.

According to that first variant, the method may further include forming the T-coil termination network in an integrated circuit device, forming at least a portion of the third inductor in a first metal layer of the integrated circuit device, and forming at least a portion of the fourth inductor in a second metal layer of the integrated circuit device. The portion of the third inductor in the first metal layer and the portion of the fourth inductor in the second metal layer may form the second bridge capacitance.

According to implementations of the subject matter of this disclosure, a method of forming a T-coil network on an integrated circuit device, where the T-coil network includes a first inductor in series with a second inductor, the first and second inductors being bridged by a bridge capacitance, includes forming at least a portion of the first inductor in a first metal layer of the integrated circuit device, forming at least a portion of the second inductor in a second metal layer of the integrated circuit device, and interconnecting the at least a portion of the first inductor and the at least a portion of the second inductor through a via from the first metal layer to the second metal layer, where the portion of the first inductor in the first metal layer and the portion of the second inductor in the second metal layer may form the bridge capacitance.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
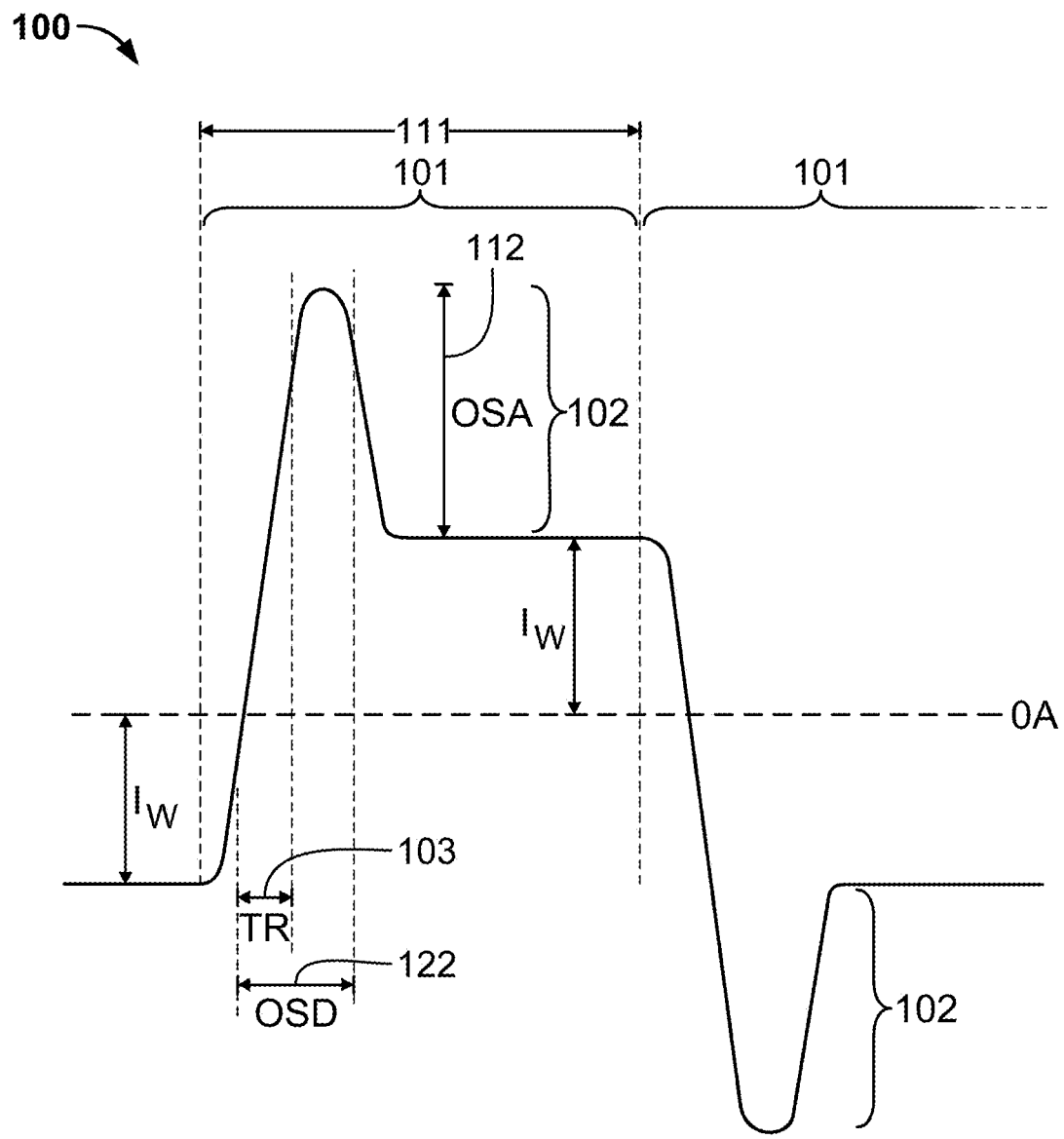
FIG. 1 shows a typical write current waveform for a hard disk drive preamplifier.

As noted above, in hard disk drive write circuitry, data is applied as current pulses to a magnetic write head by a write current driver, based on an input data signal. As each pulse begins its excursion (in either the positive or negative direction) away from the steady-state current level (which may be 0A or some other value), an overshoot amplitude (OSA) is applied by an OSA driver (which may be separate from, or integrated with, the write current driver) for a portion (the overshoot duration, OSD) of the pulse duration. Impedance mismatch between (a) the write current driver and/or the OSA driver, and (b) the transmission line together with the write head, can give rise to reflections or other distortions that limit the bandwidth, and therefore the rate, of the data that can written. Conventionally, resistance or a shunt inductance has been used for impedance matching, but such techniques may not be effective at high write currents (e.g., over 240 mA) and/or high data rates (e.g., over 3 Gbps).

In accordance with implementations of the subject matter of this disclosure, a bridged T-coil termination network is used for impedance matching between (a) the write current and OSA drivers and (b) the transmission line together with the write head. A bridged T-coil includes two mutually-coupled inductors and a bridge capacitor. The bridge capacitor may be an actual capacitor device, or may be an intrinsic capacitor resulting from the parasitic fringing capacitance between the two coupled inductors. The write current driver output may be connected to the center tap of the two inductors (which form the "crossbar" of a "T"), and the intrinsic capacitance of the write current driver, together with wiring parasitics, couples the center tap to ground, forming the upright of the "T." The OSA driver output may be connected to the terminal at one end of the T-coil that connects to the transmission line leading to the write head through an output pad. The loading capacitance of the output pad is dominated by the intrinsic capacitance of the OSA driver, its wiring parasitics, and pad parasitics. The terminal at the other end of the T-coil may be connected to a termination resistor with common mode voltage supplied.

The T-coil can be viewed as having the magnetic coupling action of a transformer whose coils are wound to form a negative mutual inductance. With proper design, the negative mutual inductance element can cancel the loading capacitance Cui that occurs at the center tap because of the series connection. This allows for an improvement in OSA driver speed and impedance matching, with extension to a higher bandwidth. The OSA driver may connect to the center tap together with the write current driver, further extending the bandwidth resulting from impedance matching. However, this reduces driver voltage headroom because of high write currents flowing to the write head through the T-coil parasitic resistance.

A similar description of the bandwidth extension can be applied to current transfer function bandwidth of the write head from the OSA driver where the loading capacitance at the center tap is cancelled. This can be understood conceptually by recognizing that at high frequencies, the bridge capacitance acts as a short circuit between the output pad and the termination resistor, while at low frequencies, the coupled inductors of the T-coil play the same role while bridge capacitor acts as an open circuit. In the resulting equivalent circuit, the OSA current driver is in parallel with the termination resistor and the output capacitance (which is reduced to about 60% of the original output capacitance of OSA driver and write current driver combined). With lower output capacitance, the bandwidth of the OSA driver is extended. This leads to faster write output rise time at the write head.

The two inductors of the T-coil may be formed on the integrated circuit device in two layers, thereby forming the bridge capacitor as well, as described in more detail below.

The subject matter of this disclosure may be better understood by reference to FIGS. 1-9.

A typical write current waveform 100 for a hard disk drive preamplifier is shown in FIG. 1. Each pulse 101 of write current waveform 100 has a steady-state value of $\pm I_w$. At the beginning of each pulse 101, which has a duration 111, an overshoot pulse 102, having an overshoot amplitude (OSA) 112, is applied for an overshoot duration (OSD) 122 which is only a portion of pulse duration 111. The overshoot pulse 102 is applied regardless of the transition direction of the current pulse 101 (i.e., whether transitioning from $+I_w$ to $-I_w$, or from $-I_w$ to $+I_w$). The "rise time" TR 103 (whether rising or falling) is very fast, with an excursion of $2I_w$+OSA occurring in just a fraction the OSD. Providing such large currents (e.g., 240 mA or more) at such high rates may involve large bipolar devices having large intrinsic capacitance, which may limit the available bandwidth and cause impedance mismatch.

Conventionally, a termination resistor (e.g., 25Ω for a 240 mA current) has been used for impedance matching. However, the bandwidth created by the termination resistor and the output capacitance is limited to 3.4 GHZ. More recently, a shunt inductance with a value between 0.5 nH and 1.0 nH has been added in series with the termination resistor, with the effect of pushing the 3 dB drop-off point to about 6.1 GHZ. However, as data rates increase beyond 5 Gbps, with a rise time less than 140 ps, those techniques are becoming insufficient.

Figure 2:
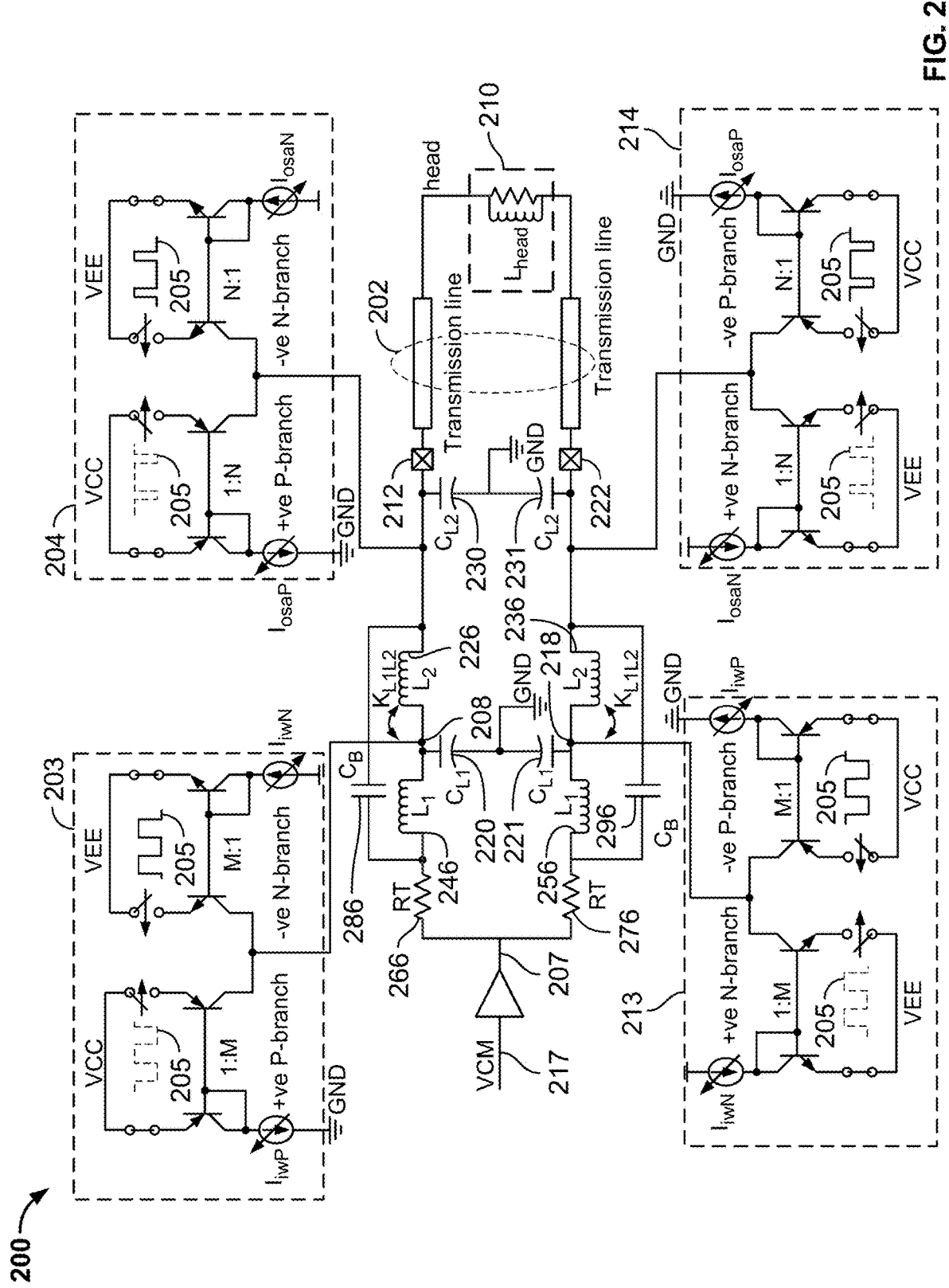
FIG. 2 is a schematic diagram of hard disk drive write circuitry in accordance with implementations of the subject matter of this disclosure.

Therefore, in accordance with implementations of the subject matter of this disclosure, a bridged T-coil architecture may be used for impedance matching in hard disk drive write circuitry. One such implementation 200 of hard disk drive write circuitry is shown in FIG. 2. Although hard disk drive write circuitry 200 is shown as an H-bridge circuit, half H-bridge hard disk drive write circuitry would be within the scope of this disclosure. Differences between H-bridge and half H-bridge implementations will be discussed below.

In hard disk drive write driver circuitry 200, write head 210 (having intrinsic inductance $L_{head}$, as shown) is coupled to a differential transmission line 202. In this implementation, the driver circuitry may be located on an integrated circuit device (not explicitly shown), and transmission line 202 may be coupled to the integrated circuit device at terminal pads 212 (for the positive leg or branch), 222 (for the negative leg or branch).

The write current ($I_w$) driver is divided into a first write current driver portion 203 which provides the positive P-branch and the negative N-branch of the differential write current, and a second write current driver portion 213 which provides the negative P-branch and the positive N-branch of the differential write current. Similarly, the overshoot current (OSA) driver is divided into a first overshoot current driver portion 204 which provides the positive P-branch and the negative N-branch of the differential overshoot current, and a second overshoot current driver portion 214 which provides the negative P-branch and the positive N-branch of the differential overshoot current.

Each of first write current driver portion 203, second write current driver portion 213, first overshoot current driver portion 204, and second overshoot current driver portion 214 is a current-mirror-based circuit that is driven by input data pulses 205.

First overshoot current driver portion 204 is coupled to pad 212, while second overshoot current driver portion 214 is coupled to pad 222. A respective positive T-coil termination network 206 or negative T-coil termination network 216 includes a first inductor $L_2$ (226, 236) mutually coupled with a second inductor $L_1$ 246, 256 to form the "crossbar" of the "T." The second inductor $L_1$ 246, 256 of each respective inductor crossbar 226/246, 236/256 is connected in series with a respective termination resistor RT 266, 276. The respective other terminal (not coupled to one of inductors 246, 256) of each termination resistor 266, 276 is coupled to a common voltage 207, which may be halfway between supply voltage rails.

In each leg, the two inductors $L_1$, $L_2$ have a coupling coefficient $K_{L1L2}$, giving rise to a mutual inductance $L_M$, discussed below. As already discussed, the two inductors $L_1$, $L_2$ of each leg are bridge by a respective bridge capacitance $C_B$ 286, 296. While the bridge capacitance may be provided by a real capacitor, in this implementation the bridge capacitance may be inherent in inductors $L_1$, $L_2$.

As noted above, first overshoot current driver portion 204 is coupled to pad 212, while second overshoot current driver portion 214 is coupled to pad 222. Similarly, first write current driver portion 203 is coupled to node 208 in the center of the crossbar between inductors 226 and 246, while second write current driver portion 213 is coupled to node 218 in the center of the crossbar between inductors 236 and 256. A common mode voltage is formed by a reference voltage 217 and a buffer or regulator 207.

In addition, each H-bridge driver portion has an intrinsic capacitance to ground. Specifically, each of first write current driver portion 203 and second write current driver portion 213 has a respective intrinsic capacitance $C_{L1}$ 220, 221 to ground, while each of first overshoot current driver portion 204 and second overshoot current driver portion 214 has a respective intrinsic capacitance $C_{L2}$ 230, 231 to ground. However, the intrinsic capacitances $C_{L1}$ 220, 221 may be compensated by the aforementioned mutual inductance, reducing the effective total output capacitance of write driver circuitry 200 closer to capacitance $C_{L2}$ 230, 231.

Write driver circuitry 200 has been described as H-bridge circuitry. However, as noted above, the write driver circuitry may be half-H-bridge circuitry. In such an implementation, second write current driver portion 213 and second overshoot current driver portion 214, as well as inductors 236, 256 and termination resistor 276 would be omitted. Transmission line 202 would be single-ended, pad 222 would be omitted, and the terminal of write head 210 that is not coupled to pad 212 would be coupled to the aforementioned common voltage 207, as would termination resistor 266.

Figure 3:
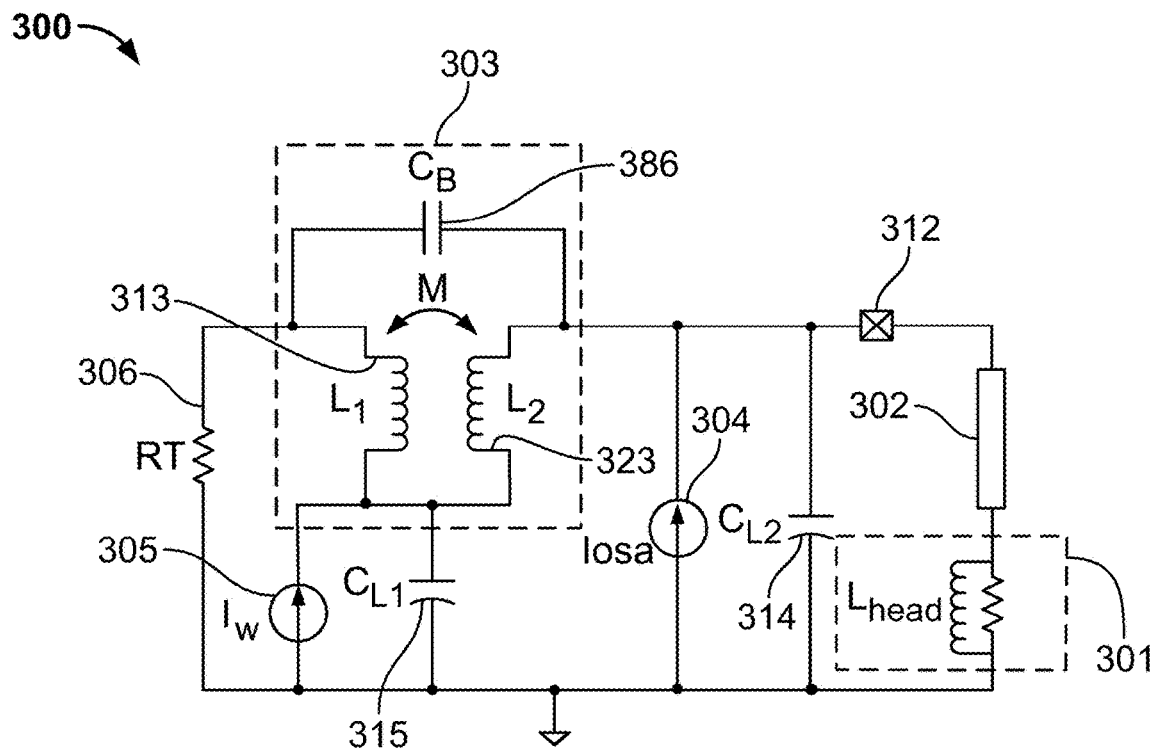
FIG. 3 is a simplified schematic diagram of hard disk write driver circuitry in accordance with implementations of the subject matter of this disclosure.

Hard disk write driver circuitry can be represented by the simplified small-signal half-H-bridge equivalent circuitry 300 of FIG. 3, in which write head 301 is connected by single-ended transmission line 302 (which may have, e.g., a 250 impedance) to bridged T-coil termination network 303, which is modeled as a transformer including two inductors $L_1$ 313 and $L_2$ 323 with mutual inductance M and bridge capacitance $C_B$ 386, at pad 312. Overshoot current driver 304, with its intrinsic capacitance $C_{L2}$ 314, is in parallel with write head 301 between pad 312 and ground, while write current driver 305, with its intrinsic capacitance $C_{L1}$ 315, is between bridged T-coil termination network 303 and ground. Termination resistor RT 306 is in parallel with bridged T-coil termination network 303 and write current driver 305.

Figure 4:
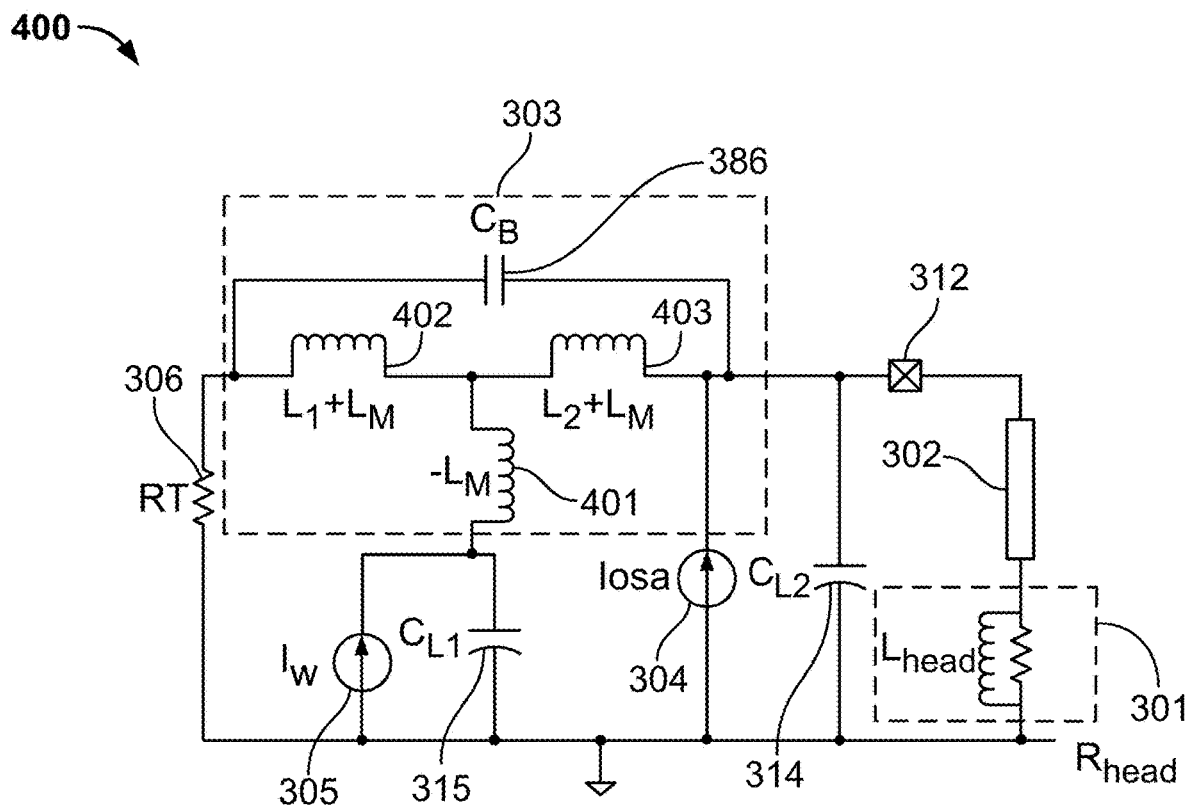
FIG. 4 is a further simplified schematic diagram of the hard disk write driver circuitry of FIG. 3.

Circuitry 300 can be represented as the further simplified circuitry 400 of FIG. 4, in which the mutual inductance M between inductors $L_1$ 313 and $L_2$ 323 can be modeled as a negative inductance $-L_M$ 401, which forms the upright of the "T" between the crossbar inductors which are increased to $L_1+L_M$ 402 and $L_2+L_M$ 403. This simplified circuitry 400 can be further broken down into separate simplified circuitry 500 (FIG. 5) illustrating the bandwidth improvements for overshoot current driver 304, and simplified circuitry 600 (FIG. 6) illustrating the bandwidth improvements for write current driver 305.

Figure 5:
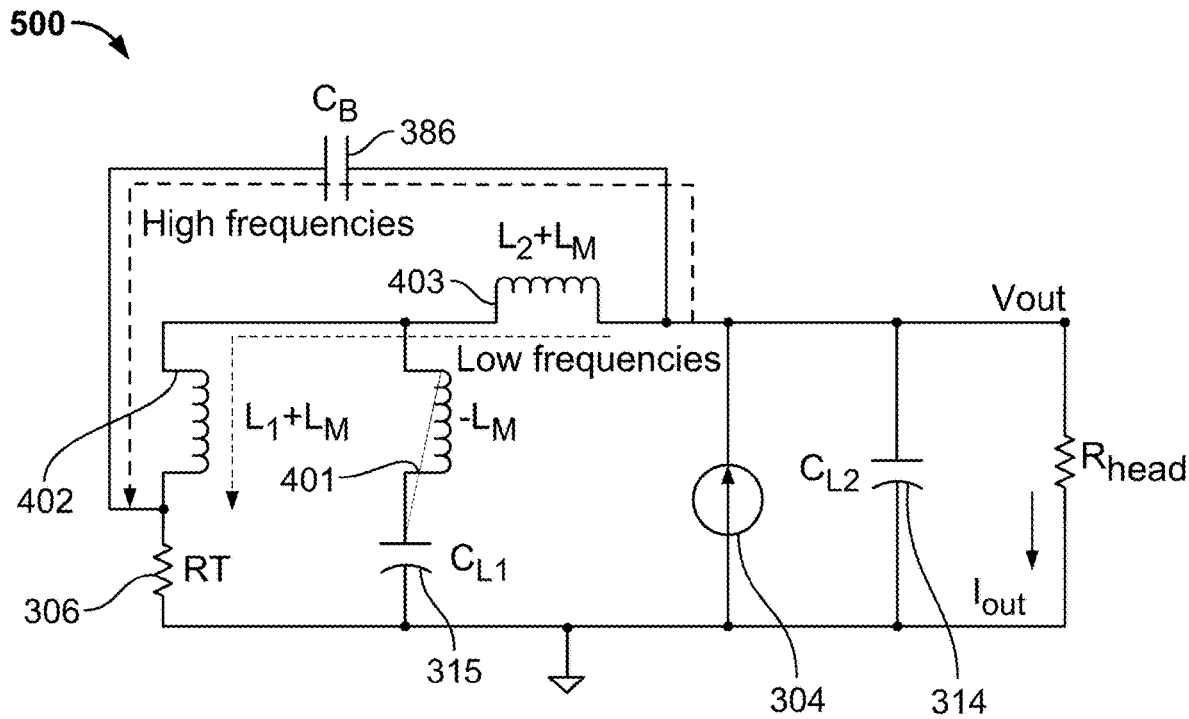
FIG. 5 is a further simplified schematic diagram of a first portion of the hard disk write driver circuitry of FIG. 4.

As seen in FIG. 5, at low frequencies, both $L_1+L_M$ 402 and $L_2+L_M$ 403 are short circuits, and at high frequencies $C_B$ 386 acts as a short circuit while $L_1+L_M$ 402 and $L_2+L_M$ 403 act as open circuits. Similarly, at low frequencies $C_{L1}$ 315 is an open circuit while at high frequencies the negative inductance $-L_M$ 401 is an open circuit, so at both high and low frequencies the combination of $C_{L1}$ 315 and $-L_M$ 401 is an open circuit and can be ignored, and the impedance across overshoot current driver 304 is the parallel combination of $C_{L2}$ 314, which is about 60% of the original combined capacitance of the overshoot current driver 304 and the write current driver 305, and RT 306. The reduced output impedance extends the output impedance bandwidth and the current transfer function bandwidth of the write head from the OSA driver.

Figure 6:
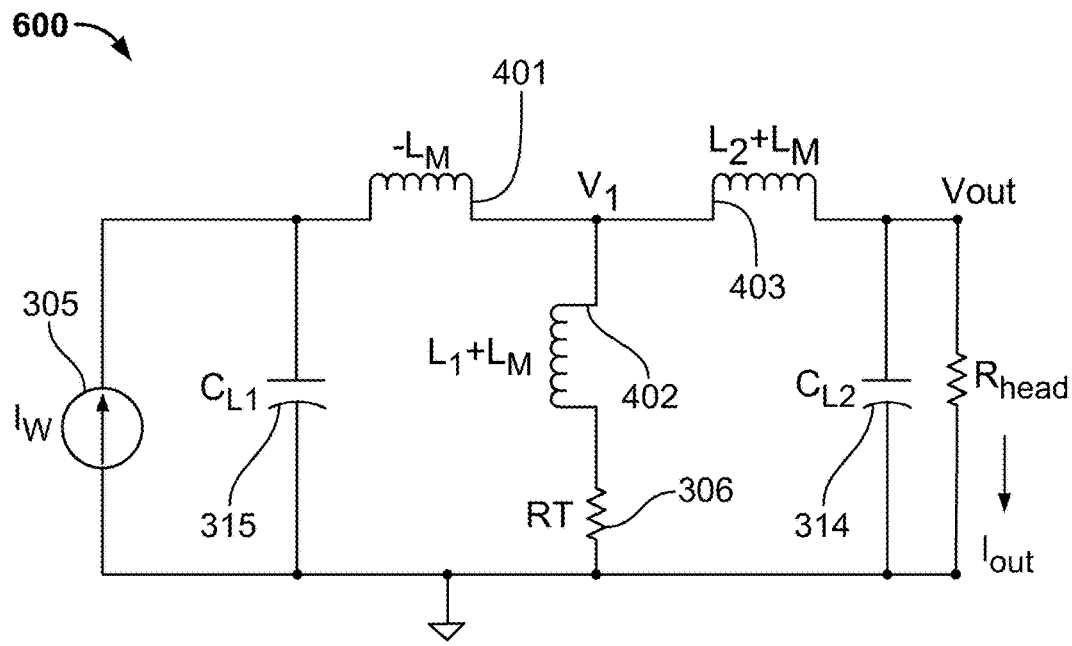
FIG. 6 is a further simplified schematic diagram of a second portion of the hard disk write driver circuitry of FIG. 4.
Figure 7:
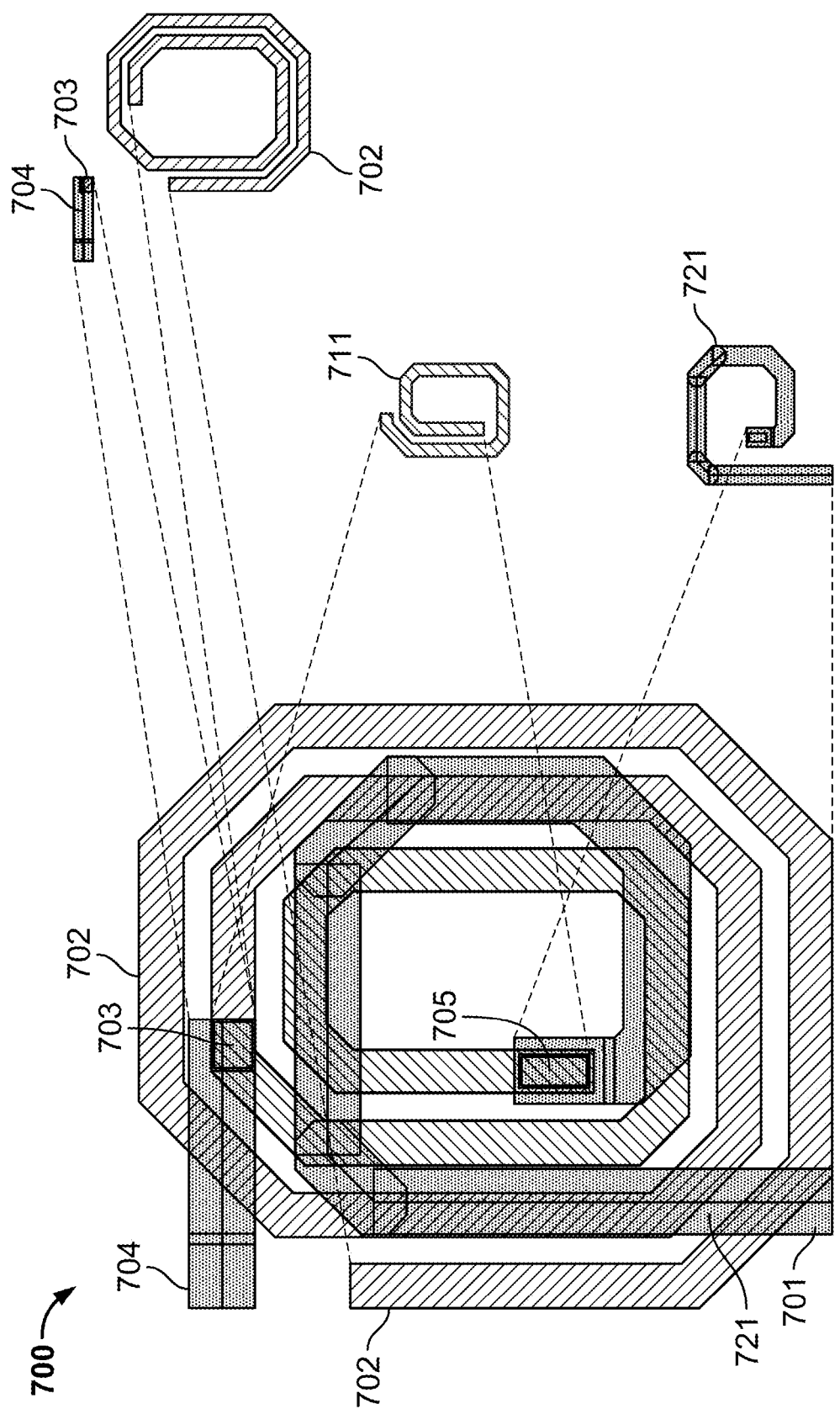
FIG. 7 illustrates an integrated circuit device layout of T-coil circuitry in accordance with implementations of the subject matter of this disclosure.

On the other hand, as seen in FIG. 6, the output voltage $V_{out}$ is a voltage division of intermediate voltage V1 between inductance $L_2+L_M$ 403 and capacitance $C_{L2}$ 314, and at high frequencies the impedance of capacitance $C_{L2}$ 314 becomes lower while the impedance of inductance $L_2+L_M$ 403 becomes higher, resulting in lower output voltage $V_{out}$. Although capacitance $C_{L1}$ 315 is only about 40% of the combined capacitance of overshoot current driver 304 and the write current driver 305, at high frequencies, the current flow through $-L_M$ 401, in series with the parallel combination of (a) $L_1+L_M$ 402 and RT 306, with (b) $L_2+L_M$ 403 and capacitance $C_{L2}$ 314, reducing the amplitude of the signal to the write head by the voltage division of $V_{out}$ as explained above. Therefore, the current transfer function to the write head 301 from write current driver 305 is limited.

However, while the current transfer function bandwidth extension available for the write current driver 305 in FIG. 6 is not as substantial as the bandwidth extension available for the overshoot current driver 304 in FIG. 5, the bandwidth is nevertheless extended because the overall write output current response is dominated by the speed of overshoot current driver 304 with its short pulse form, and higher overshoot current amplitude as compared to write current driver 305.

Specifically, it has been observed that using a bridged T-coil arrangement as disclosed herein extends the data rate at which the current gain $I_o/I_i$ decreases by 3 dB from 3.4 GHz using only a termination resistor RT, or 6.1 GHZ using a shunt-peaking inductor, to 9.3 GHZ (about 2.7 times better than using only a termination resistor, and still about 1.5 times better than using a shunt-peaking inductor). As a result, as measured, e.g., on an "eye diagram," peak variance is reduced by 25% from 60 mA to 45 mA, DC settling is reduced by about 67% from 30 mA to 10 mA, and peakto-peak jitter (computed as ((1/data_rate)-eye_width)) is reduced by about 27% from 43 ps to 31 ps.

Forming a bridged T-coil requires two mutually-coupled inductors, which can occupy substantial area on an integrated circuit device. In an implementation 700 shown in FIG. 7, two inductors $L_1$ 701 and $L_2$ 702 are formed using minimized device area. First, to support high write output current, the overall parasitic resistance for each inductor 701, 702 is reduced by using an octagonal shape, rather than a square or rectangular shape, because of the improved Q-factor of the octagonal shape. Second, the two inductors 701, 702 are formed across two separate metal layers of the integrated circuit device, inductors $L_1$ 701 and $L_2$ 702. A second portion 721 of inductor $L_1$ 701 is formed in the lower metal layer, connected to portion 711 of inductor $L_1$ 701 in the upper metal layer by via 705. The bridge capacitance $C_B$ is formed between inductor $L_2$ 702 in the upper metal layer, and portion 721 of inductor $L_1$ 701 in the lower metal layer. Although other implementations are possible, such as an implementation (not shown) in which all of inductor $L_1$ 701 is formed in the lower metal layer, such an implementation would require a larger area for inductor $L_1$ 701, or would require the turns of inductor $L_1$ 701 to be closer together, which would increase undesirable interwinding capacitance within inductor $L_1$ 701.

Figure 8:
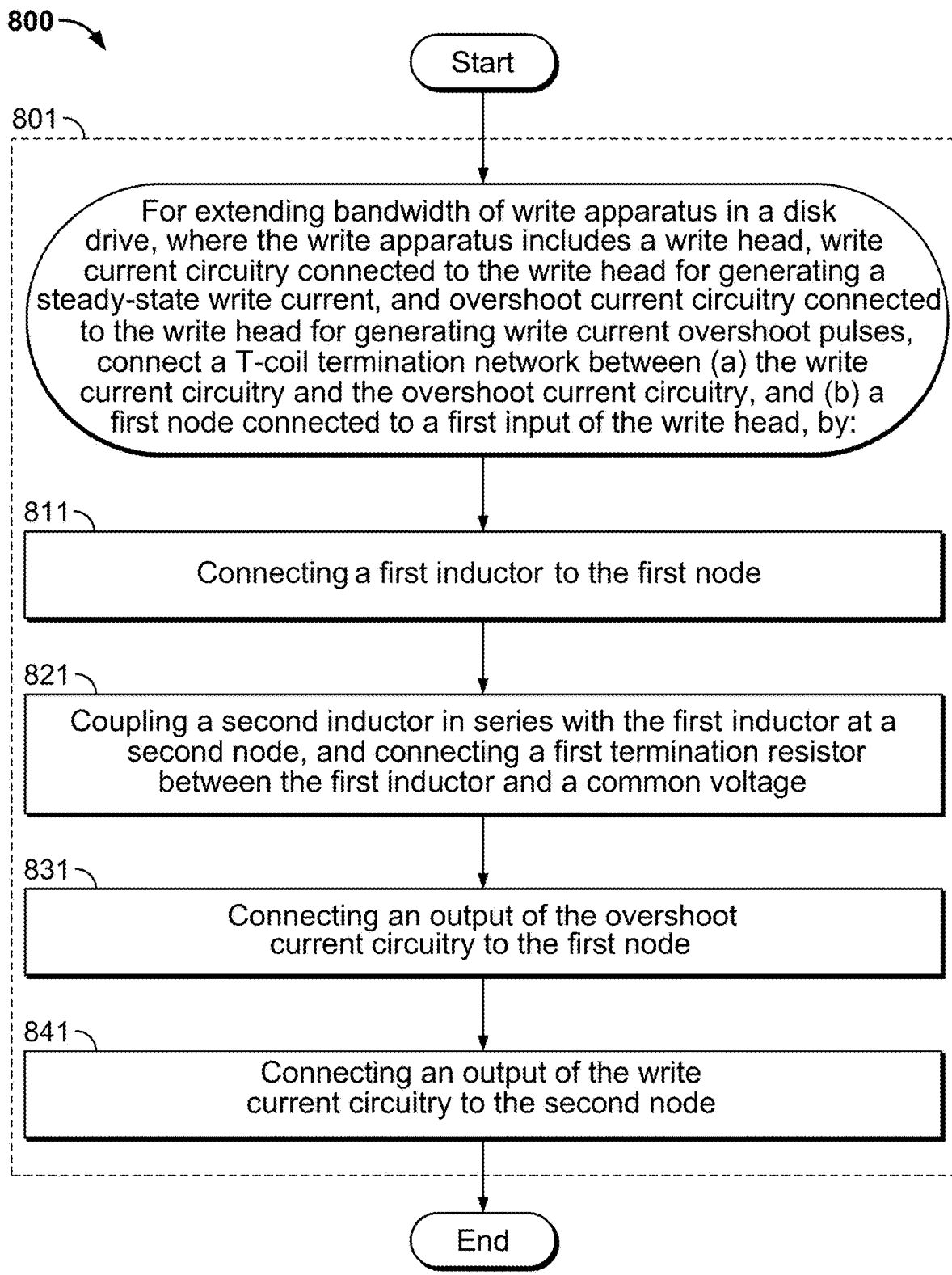
FIG. 8 is a flow diagram illustrating implementations of a first method in accordance with the subject matter of this disclosure.
Figure 9:
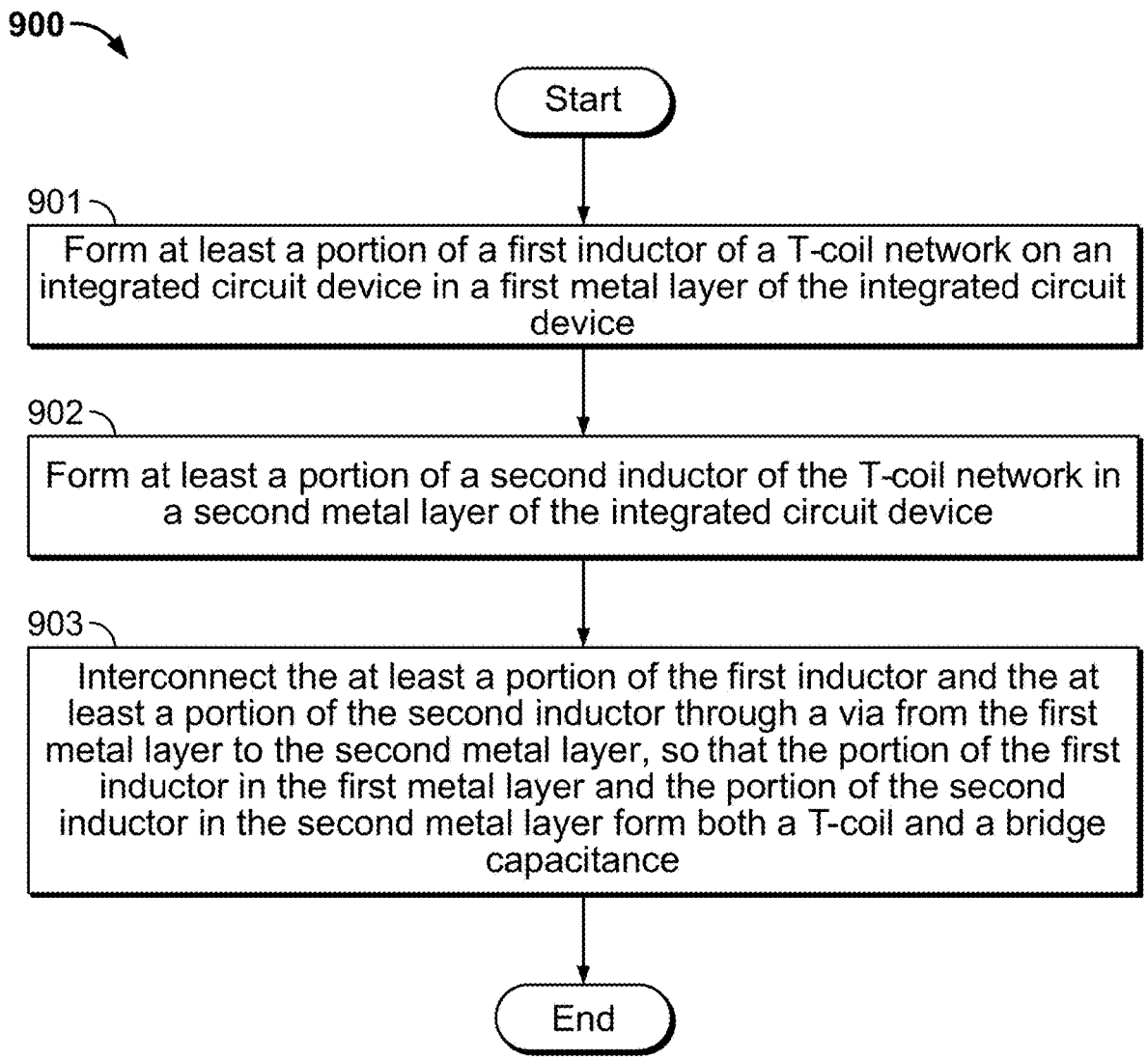
FIG. 9 is a flow diagram illustrating implementations of a second method in accordance with the subject matter of this disclosure.

A method 800 in accordance with the subject matter of this disclosure, for extending bandwidth of write circuitry in a disk drive, is diagrammed in FIG. 8. Method 800 begins at 801, where, for extending bandwidth of write apparatus in a disk drive—where the write apparatus includes a write head, write current circuitry connected to the write head for generating a steady-state write current, and overshoot current circuitry connected to the write head for generating write current overshoot pulses—a T-coil termination network is connected between (a) the write current circuitry and the overshoot current circuitry, and (b) a first node connected to a first input of the transmission line together with the write head. Elements of the connecting at 801 include, at 811, connecting a first inductor to the first node. Elements of the connecting at 801 further include, at 821, coupling a second inductor in series with the first inductor at a second node, and connecting a first termination resistor between the first inductor and a common voltage. Elements of the connecting at 801 further include, at 831, connecting an output of the overshoot current circuitry to the first node. Elements of the connecting at 801 further include, at 841, connecting an output of the write current circuitry to the second node. The connecting at 801, and method 800, then end.

A method 900 in accordance with the subject matter of this disclosure, for forming a T-coil network on an integrated circuit device—where the T-coil network includes a first inductor mutually coupled with a second inductor, the first and second inductors being bridged by a bridge capacitance—begins at 901 where at least a portion of a first inductor of a T-coil network is formed in a first metal layer of the integrated circuit device. Next, at 902, at least a portion of a second inductor of the T-coil network is formed in a second metal layer of the integrated circuit device. At 903, the at least a portion of the first inductor and the at least a portion of the second inductor are interconnected through a via from the first metal layer to the second metal layer, so that the portion of the first inductor in the first metal layer and the portion of the second inductor in the second metal layer form both a T-coil and a bridge capacitance. Method 900 then ends.

Thus it is seen that a method and apparatus for increasing the bandwidth of hard disk drive write circuitry, including use of a bridged T-coil arrangement for impedance matching between write current drivers and the transmission line together with the write head, to increase bandwidth, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Write apparatus for a disk drive, the write apparatus comprising:
  a write head;
  write current circuitry connected to the write head for generating a steady-state write current;
  overshoot current circuitry connected to the write head for generating write current overshoot pulses; and
  a T-coil termination network between (a) the write current circuitry and the overshoot current circuitry, and (b) a first node connected to a first input of a transmission line together with the write head.

2. The write apparatus of claim 1 wherein:
  the T-coil termination network comprises:
  a first inductor connected to the first node,
  a second inductor coupled with the first inductor at a second node, and
  a first termination resistor between the first inductor and a common voltage;
  an output of the overshoot current circuitry is connected to the first node; and
  an output of the write current circuitry is connected to the second node.

3. The write apparatus of claim 2 wherein the first inductor and the second inductor are bridged by a first inherent bridge capacitance.

4. The write apparatus of claim 3 wherein:
  the T-coil termination network is formed in an integrated circuit device;
  at least a portion of the first inductor is formed in a first metal layer of the integrated circuit device;
  at least a portion of the second inductor is formed in a second metal layer of the integrated circuit device; and
  the portion of the first inductor in the first metal layer and the portion of the second inductor in the second metal layer form the first inherent bridge capacitance.

5. The write apparatus of claim 2 wherein:
  the write head is configured to receive a half-H-bridge signal;
  each of the overshoot current circuitry and the write current circuitry is single-ended;
  a second input of the write head is connected to the common voltage; and
  the common voltage is centered between supply voltage rails.

6. The write apparatus of claim 2 wherein:
  the write head is configured to receive a differential signal, the first input of the write head being connected to a positive leg of the differential signal at the first node and a second input of the write head being connected to a negative leg of the differential signal at a third node;
  the write current circuitry is differential write current circuitry having a first write current output configured for connecting to the positive leg and a second write current output configured for connecting to the negative leg;

the overshoot current circuitry is differential overshoot current circuitry having a first overshoot current output configured for connecting to the positive leg and a second overshoot current output configured for connecting to the negative leg;

the common voltage is a common mode voltage of an H-bridge signal; and the T-coil termination network is a differential T-coil termination network.

7. The write apparatus of claim 6 wherein:

the first inductor, the second inductor and the first termination resistor are in the positive leg of the differential T-coil termination network, the output of the overshoot current circuitry that is connected to the first node being the first overshoot current output of the overshoot current circuitry, and the output of the write current circuitry that is connected to the second node being the first write current output of the write current circuitry;

the differential T-coil termination network further comprises:

a third inductor, a fourth inductor coupled with the third inductor at a fourth node, and a second termination resistor between the third inductor and the common mode voltage;

the second overshoot current output of the overshoot current circuitry is connected to the third inductor and the write head at the third node; and the second write current output of the write current circuitry is connected to the fourth node.

8. The write apparatus of claim 7 wherein the third inductor and the fourth inductor are bridged by a second inherent bridge capacitance.

9. The write apparatus of claim 8 wherein:

the T-coil termination network is formed in an integrated circuit device;

at least a portion of the third inductor is formed in a first metal layer of the integrated circuit device;

at least a portion of the fourth inductor is formed in a second metal layer of the integrated circuit device; and the portion of the third inductor in the first metal layer and the portion of the fourth inductor in the second metal layer form the second inherent bridge capacitance.

10. A method for extending bandwidth of write apparatus in a disk drive, the write apparatus including a write head, write current circuitry connected to the write head for generating a steady-state write current, and overshoot current circuitry connected to the write head for generating write current overshoot pulses, the method comprising:

connecting a T-coil termination network between (a) the write current circuitry and the overshoot current circuitry, and (b) a first node connected to a first input of the write head.

11. The method according to claim 10 for extending bandwidth of write apparatus in a disk drive, wherein connecting the T-coil termination network comprises:

connecting a first inductor to the first node, coupling a second inductor in series with the first inductor at a second node, and connecting a first termination resistor between the first inductor and a common voltage; the method further comprising:

connecting an output of the overshoot current circuitry to the first node; and connecting an output of the write current circuitry to the second node.

12. The method according to claim 11 for extending bandwidth of write apparatus in a disk drive, the method further comprising bridging the first inductor and the second inductor by a first bridge capacitance.

13. The method according to claim 12 for extending bandwidth of write apparatus in a disk drive where the T-coil termination network is formed in an integrated circuit device, wherein bridging the first inductor and the second inductor by a first bridge capacitance comprises:

forming at least a portion of the first inductor in a first metal layer of the integrated circuit device; and forming at least a portion of the second inductor in a second metal layer of the integrated circuit device; wherein:

the portion of the first inductor in the first metal layer and the portion of the second inductor in the second metal layer form the first bridge capacitance.

14. The method according to claim 11 for extending bandwidth of write apparatus in a disk drive, the method further comprising:

configuring the write head to receive a half-H-bridge signal, each of the overshoot current circuitry and the write current circuitry being single-ended; and connecting a second input of the write head to the common voltage, the common voltage being centered between supply voltage rails.

15. The method according to claim 11 for extending bandwidth of write apparatus in a disk drive, the method further comprising:

configuring the write head to receive an H-bridge signal, the first input of the write head being connected to a positive leg of the H-bridge signal at the first node and a second input of the write head being connected to a negative leg of the H-bridge signal at a third node;

connecting a first write current output of the write current circuitry, the write current circuitry being differential, to the positive leg, and connecting a second write current output of the write current circuitry to the negative leg; and connecting a first overshoot current output of the overshoot current circuitry, the overshoot current circuitry being differential, to the positive leg, and connecting a second overshoot current output of the overshoot current circuitry to the negative leg.

16. The method according to claim 15 for extending bandwidth of write apparatus in a disk drive, the common voltage being a common mode voltage of H-bridge circuitry, wherein:

connecting the T-coil termination network comprises connecting a differential T-coil network; and connecting a first termination resistor between the first inductor and a common voltage comprises connecting the first termination resistor between the first inductor and the common mode voltage.

17. The method according to claim 16 for extending bandwidth of write apparatus in a disk drive, where the first inductor, the second inductor and the first termination resistor are in the positive leg of the differential T-coil termination network, the output of the overshoot current circuitry that is connected to the first node being the first overshoot current output of the overshoot current circuitry, and the output of the write current circuitry that is connected to the second node being the first write current output of the write current circuitry, wherein connecting the differential T-coil termination network comprises:

connecting the second overshoot current output of the overshoot current circuitry to a third inductor and the write head at a third node, connecting a fourth inductor coupled in series with the third inductor at a fourth node, and connecting a second termination resistor between the third inductor and the common mode voltage; the method further comprising:

connecting the second write current output of the write current circuitry to the fourth node.

18. The method according to claim 17 for extending bandwidth of write apparatus in a disk drive, the method further comprising bridging the third inductor and the fourth inductor by a second bridge capacitance.

19. The method according to claim 18 for extending bandwidth of write apparatus in a disk drive, the method further comprising:

forming the T-coil termination network in an integrated circuit device;

forming at least a portion of the third inductor in a first metal layer of the integrated circuit device; and forming at least a portion of the fourth inductor in a second metal layer of the integrated circuit device; wherein:

the portion of the third inductor in the first metal layer and the portion of the fourth inductor in the second metal layer form the second bridge capacitance.

* * * * *